Figure 2:
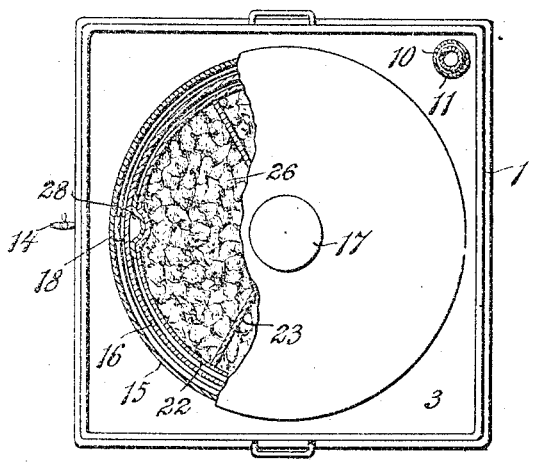

A. F. J. JOHNSON (BY JUDICIAL CHANGE OF NAME NOW A. F. JENKINS).
ACETYLENE GENERATOR AND TORCH.
APPLICATION FILED MAY 10, 1907.

956,359.

Patented Apr. 26, 1910.

3 SHEETS—SHEET 1.

Witnesses

Inventor
Alexander F. J. Johnson

A. F. J. JOHNSON (BY JUDICIAL CHANGE OF NAME NOW A. F. JENKINS).
ACETYLENE GENERATOR AND TORCH.
APPLICATION FILED MAY 10, 1907.

956,359.

Patented Apr. 26, 1910.

3 SHEETS—SHEET 2.

A. F. J. JOHNSON (BY JUDICIAL CHANGE OF NAME NOW A. F. JENKINS).
ACETYLENE GENERATOR AND TORCH.
APPLICATION FILED MAY 10, 1907.
956,359.
Patented Apr. 26, 1910.
3 SHEETS—SHEET 3.
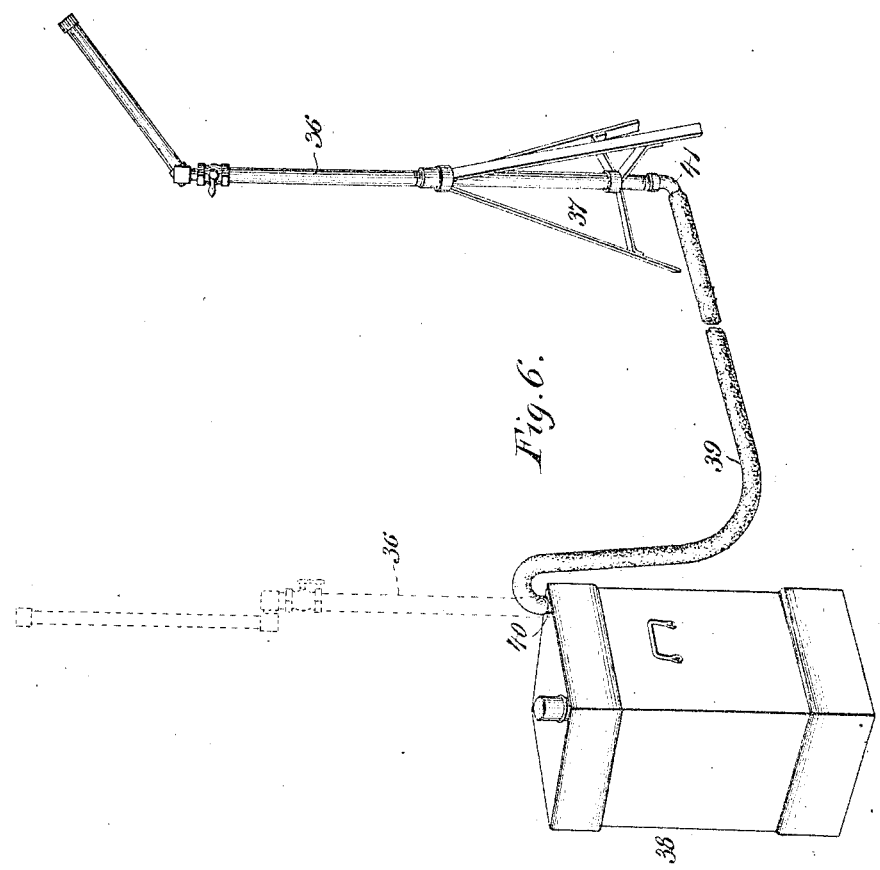
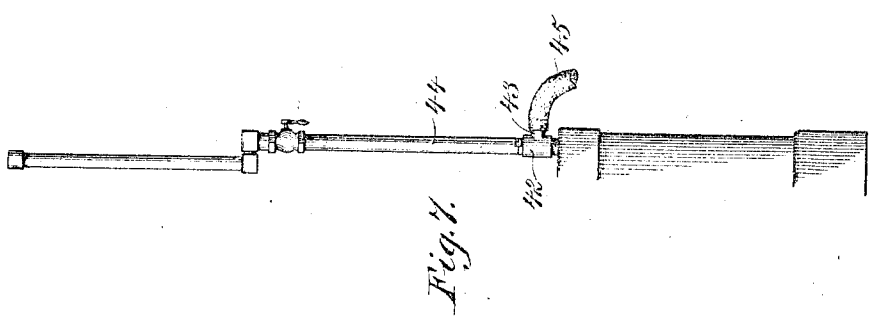

UNITED STATES PATENT OFFICE.

ALEXANDER F. J. JOHNSON, (BY JUDICIAL CHANGE OF NAME NOW ALEXANDER F. JENKINS,) OF BALTIMORE, MARYLAND, ASSIGNOR TO ALEXANDER MILBURN COMPANY, OF BALTIMORE, MARYLAND, A CORPORATION OF MARYLAND.

ACETYLENE GENERATOR AND TORCH.

956,359.  Specification of Letters Patent.  Patented Apr. 26, 1910.

Application filed May 10, 1907. Serial No. 372,972.

*To all whom it may concern:*

Be it known that I, ALEXANDER F. JENKINS, (formerly ALEXANDER F. J. JOHNSON,) a subject of the King of Great Britain, residing at Baltimore, in the State of Maryland, have invented certain new and useful Improvements in Acetylene Generators and Torches, of which the following is a specification.

This invention relates to a combined acetylene generator and torch light of the portable type, especially adapted for contractors, builders, vehicles, motor cars and the like, for use in various construction work carried on by night, or by day, as in excavating and tunneling; and while the invention is admirably adapted as a portable illuminating apparatus, there are certain features that are susceptible to more general application.

The invention has for one of its objects to improve and simplify the construction and operation of apparatus of the character referred to so as to be comparatively easy and inexpensive to manufacture, convenient to manipulate, and highly efficient and reliable in service.

A further object of the invention is the provision of a generator tank having a self contained washer for cleansing the gas before passing to the torch and serving at the same time as a means for preventing the flame from passing back from the burner to the generating chamber, or back firing, as it is commonly termed. In some forms of portable lighting sets special devices are employed for preventing back firing, whereas in the present invention no such adjunct is required since the washer performs this function.

A still further object is to provide a simple and effective water feed whereby the supply of water to the carbid can be varied to a nicety to automatically produce gas in accordance with the demand.

Another object of the invention is the employment of a burner attachment so designed that the light can be readily directed to any desired point, that the burner can be removed for facilitating the packing of the apparatus for transportation, shipment, or for instantly changing to a hose attachment or other standard; that the generator cylinder can be taken out for recharging or any other purpose without necessitating the removal of the burner therewith, and that a water seal is provided to prevent leakage and waste of gas between the relatively movable parts of the burner attachment.

The invention has as an additional object to provide an apparatus including a plurality of generating chambers within a single tank and delivering the gas from all through a common washer in the base of the tank, to the burner or other means, the washer serving as a seal to permit any generating chamber to be taken out for recharging without gas escaping. And further the invention aims to produce a portable generator of extremely simple construction, designed to do away with rubber joints, screws, couplings and the like.

With these objects in view, and others, as will appear as the description proceeds the invention comprises the various novel features of construction and arrangement of parts which will be more fully described hereinafter and pointed out with particularity in the claims appended hereto.

Figure 1:
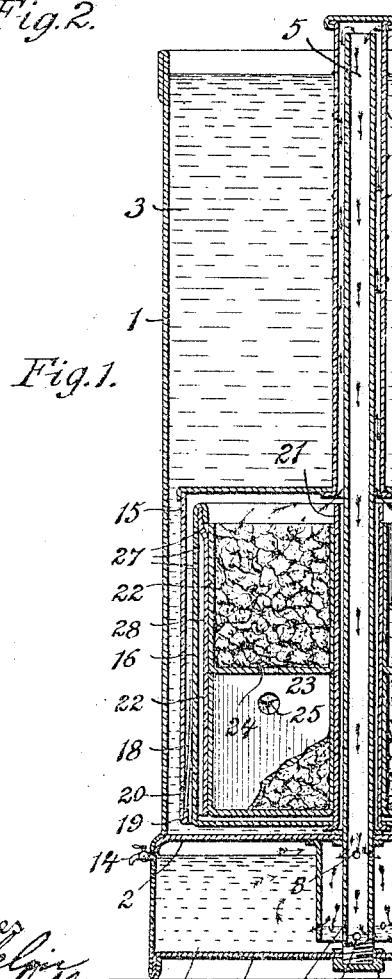
Figure 3:
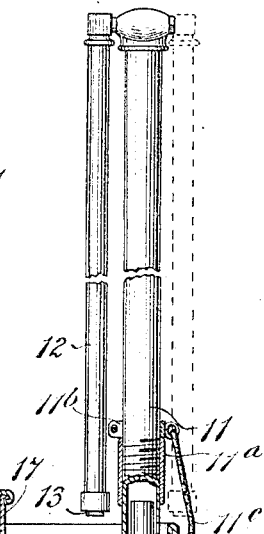
Figure 4:
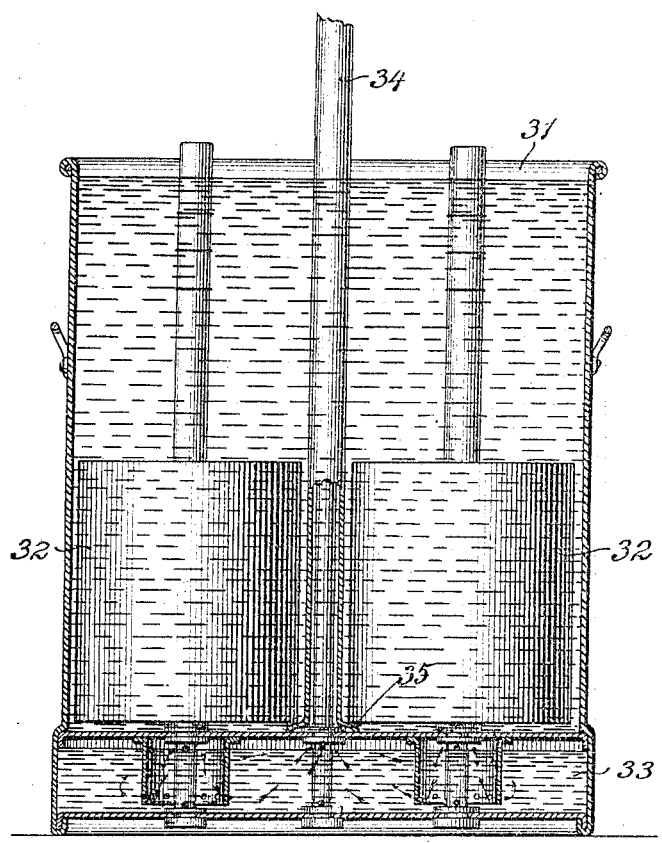
Figure 5:
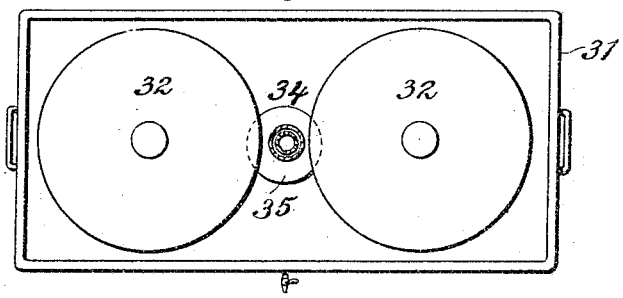

In the accompanying drawings, which illustrate one of the embodiments of the invention, Figure 1 is a central vertical section of a portable lighting set of the single generating chamber type, with portions broken away. Fig. 2 is a top plan view showing parts broken away. Fig. 3 is an enlarged fragmentary view of the two parts or drums of the generating chamber showing the spring catch for locking them together and also the wick of the water feeding device for fine regulation. Fig. 4 is a central vertical section of the double generating chamber form. Fig. 5 is a plan view thereof. Fig. 6 is a perspective view of the apparatus showing the burner section of the standard removed and connected with the inner standard section by a hose attachment. Fig. 7 is a fragmentary side elevation of the apparatus showing a modified form of burner standard, whereby a hose may be attached thereto for supplying one or more burners so as to have a number of lights at one time.

Similar reference characters are employed to designate corresponding parts throughout the views.

Referring to the drawing 1 designates the tank or casing of the device which may be of any suitable shape and size and is divided by a horizontal partition 2 into an upper generator containing compartment 3 and a base compartment 4 containing a body of water to constitute a washer for removing impurities from the gas. Arranged centrally within the tank is a vertical gas conducting pipe 5 secured in position by passing through the partition 2 and bottom 6 and clamped by nuts at the openings in the partition and bottom receiving pipe, an outside cap nut 7 being placed on the bottom of the pipe to close the end thereof. The portion of the pipe disposed in the washer compartment has outlet apertures 8 and around the pipe is a cylindrical deflector 9 for causing the gas discharging from the apertures to be directed through the water so as to be cleansed of impurities. An outlet pipe 10 communicates with the washer compartment for conducting off the washed gas to a burner. This pipe which is secured in place in the same manner as pipe 5, forms the stationary section of the burner standard, and extends upwardly some distance above the maximum water level in the compartment 3 and loosely assembled over pipe 10 is the outer section 11 of the standard, which is in the form of a straight pipe slightly larger in diameter than the inner section. The outer section, which is preferably made in two parts connected by a coupling 11$^a$ for permitting of disconnecting, slips vertically over the inner section and rests at its lower end on the bottom of this compartment. By this arrangement the comparatively long outer section can be conveniently removed in packing the apparatus for shipment or transportation, and furthermore the outer section can be readily turned through a complete revolution for throwing the light in any direction. Since the burner standard passes through the upper compartment the water therein forms a seal between the two relatively movable sections of the standard so that leakage of gas is effectively prevented. The upper section of the standard may be provided with one or more hingedly connected lengths of pipes 12 to permit the burner jet 13 to be adjusted to a point where the light is needed. The gas passes to the burner standard from the washer through aperture 14 in the fixed section 10 and also by means of these apertures the washer can be emptied and cleaned, it being merely necessary to invert the tank so as to cause the water and sediment to pass out through the pipe 10, after the outer section or pipe 11 has been removed. The washer can be readily filled through the central pipe 5 when the generator is removed and the level of the water in the washer can be ascertained by the overflow through the cock 14 in one side of the tank. To lock the burner section in position, and yet permit of ready rotation thereof, a split ring 11$^b$ is placed around the upper part of pipe 11 above the coupling 11$^a$ and a flexible element 11$^c$ connects the ring with the tank 1, thus preventing the standard from being pulled out.

The gas generating device, which is located in the compartment 3, comprises an outer and an inner cylinder or drum 15 and 16 respectively, the former being open at its bottom to assemble over the latter to form a gas container or bell. Rising from the top of the outer cylinder 15 is a tube 17 disposed over the pipe 5, whereby the gas created in the generator passes upwardly between the tube 17 and pipe 5 to enter and flow down the latter to the washer, as indicated by the arrows, and thence from the washer to the burner as hereinbefore described. The drums 15 and 16 are submerged in the water contained in the tank and normally rest on the bottom or partition 2. The drums are locked together so that they can be inserted and removed as a unitary device, and for this purpose a catch in the form of a leaf spring 18, Figs. 1 and 3, is secured to the outside of the drum 16 and is adapted to engage at its lower end the internal rim 19 of the drum. Hence by taking hold of the tube 17 as a handle the generator can be easily placed in or be removed from the tank. To release the spring catch 18, a hole 20 is provided in the cylindrical wall of the drum 15, through which the finger or suitable instrument can be inserted to press the spring catch inwardly off the rim 19, this being done, of course, when the generator is out of the tank.

The inner cylinder or drum 16 has a central tube 21 that surrounds the pipe 5 and in the cylinder are superimposed carbid containing trays 22 of any approved construction. Those shown in the present instance are of the triple compartment type divided by radial partition 23, and each tray having a water inlet opening 24 in the floor of one compartment and openings 25 in two of the partitions at different levels whereby the carbid 26 is acted on successively by water passing first into the compartment having an inlet in its bottom and thence successively into the other compartments as the water level gradually rises with the consumption of the gas.

The supply of water to the carbid chamber is effected in such a manner as to cause the generation of gas in accordance with the demand at the burner. That is to say, when there is a large flame requiring a great flow of gas, the water will be supplied in comparatively large quantity and when the demand for gas is light, the flow of water will be relatively small. To accomplish this the cylindrical wall of the inner drum 16 has a plurality of vertically spaced water inlet openings 27 adjacent the top thereof, through the lowermost one of which the water enters from between the drums when the consumption of gas is light and through two or more of which the water enters when the demand becomes heavier. This variation in the water supplied results, obviously, from the changes in the gas pressure and is, therefore, effected automatically. Within the drum 16 is a shield 28 that is disposed over the inlet openings to form a water conveying duct whereby the water is directed to the bottom of the drum and caused to act on the carbid from underneath and by a gradual rise in level. To insure an extremely slow water feed, as when a very light demand for gas is created, a fiber wick 29 may be arranged in the shield or guard 28, as shown in Fig. 3, so that the water will percolate drop by drop into the carbid containing drum. The amount of live carbid in the generator can be readily ascertained at any time by means of spaced water level rings or marks 30 on the tube 17, it being understood that as the carbid is consumed the water level in the compartment 3 gradually falls, until the lowermost mark is reached, which indicates that the generator is empty and requires recharging. To recharge, the generator is taken out of the tank 1, the outer drum unlocked and removed to permit access to the trays. These latter are taken out and their compartments emptied of the spent carbid, and new material substituted, whereupon the trays are replaced. The drums are then locked together and returned to the tank. It will thus be seen that the generator can be replenished in a simple, convenient and expeditious manner.

Referring to the double generator apparatus shown in Figs. 4 and 5, 31 designates the tank of such size as to contain a plurality of generators 32, that are similar to that hereinbefore described, and which discharge the gas into a common washer 33 in the base of the tank 31, the latter being built on the same design as the tank shown in Fig. 1. Arranged between the generators or at any other suitable point is a burner standard 34 that receives the gas from the washer as shown by the arrows. This form of generating and lighting set, has the advantage of increased capacity, simplicity of construction, and of being readily chargeable, since the generators are of such size as to be conveniently handled. By this multiple arrangement of generators any one of the latter can be taken out for recharging purposes without interfering with the operation of the burner, since the other generator or generators continue the supply of gas, and the employment of a common washer prevents the escape of gas while any generator is removed, and this without the need of cut out valves. The standard 34 has an annular flange 35 at its lower end which projects under the generators 32 so as to be locked in position by the latter.

Another important advantage of the particular form of burner standard hereinbefore described, resides in its ready adaptability for use with a hose attachment between the generator unit and burner. The use of the hose attachment is illustrated in Fig. 6. The outer section 36 of the burner standard is detached and supported in an upright position by a stand or tripod 37 and can be located at a point more or less remote from the generator unit designated by 38. The gas is supplied to the burner through a hose 39 which has one end connected with the upper extremity of the fixed section 40 of the burner standard and the other end connected by an elbow coupling 41 with the bottom of the standard section 36. From this it will be seen that by the use of three additional parts, namely, the tripod 37, hose 39 and elbow connection 41, a generating and lighting set can be operated with a hose attachment without any change in design.

In Fig. 7 a modified form of standard is shown, wherein the coupling 42 is provided with a nipple 43 for receiving a hose attachment 45. By this means the generator can supply the burner on the standard 44 and any suitable number of burners connected with the hose.

From the foregoing description, taken in connection with the accompanying drawings the advantages of the construction and of the method of operation, will be readily appreciated by those skilled in the art to which the invention relates, and while I have described the principle of operation of the invention, together with the apparatus which I now consider to be the best embodiment thereof, I desire to have it understood, that the apparatus is merely illustrative, and that various changes can be made, when desired, as are within the scope of the claims.

Having thus described my invention, what I claim is:

1. In an apparatus of the class described, the combination of a tank, a partition dividing the tank into washer and generator compartments, a removable generator disposed above the partition and communicating with the washer compartment, an outlet pipe in the tank and communicating with the washer compartment, and a removable discharge pipe assembled on and held thereby rotatably in upright position and supported by the partition and disposed within the tank to be protected thereby.

2. In an apparatus of the class described, the combination of a tank, a partition dividing the tank into water-holding washer and generator compartments disposed below and above the partition respectively, an outlet pipe secured to the partition in communication with the washer compartment and located within the tank, and a discharge pipe rotatably and removably assembled over the outlet pipe and held in an upright position thereby and projecting out of top of the tank.

3. In an apparatus of the class described, the combination of a water-containing tank, a generator therein, a washer in the tank and communicating with the generator, an outlet pipe leading from the washer and composed of relatively movable parts, the movable part extending through the tank and projecting out of the top thereof, and the first part extending upwardly in the tank and into the said removable part whereby the body of water in the tank forms a seal between the said parts and in which the generator is submerged.

4. The combination of a water-containing tank open at its top, a generator submerged therein and removable therefrom, an outlet pipe rising from the bottom of the tank and disposed between the generator and the wall of the tank, means connecting the bottom of the outlet pipe with the generator to receive gas therefrom, and a second pipe loosely telescoping on the outlet pipe to rotate thereon and disposed between the generator and wall of the tank to be immersed in the water in the latter.

5. The combination of a water-containing tank, a vertically-extending pipe mounted therein, a generator supplying gas to the pipe, a second pipe loosely assembled over the first pipe and composed of two sections and a coupling connecting the sections together, and a locking device secured to the tank and engaging the coupling for preventing accidental removal of the second pipe.

6. An apparatus of the class described comprising a tank, an upwardly conducting outlet pipe, a washer in the base of the tank and communicating with the bottom of the pipe, a removable pipe loosely mounted on the first pipe and held in upright position solely thereby, a generator in the tank, and a gas conducting pipe connecting the generator with the washer.

7. The combination of a tank, a generator therein, an upright pipe secured to the tank and connected with the generator to receive gas therefrom, a second pipe of greater length than the first-mentioned pipe and assembled over and held in upright position thereby, the lower end of the second pipe being open to slip on and off the first-mentioned pipe, and a locking device fixed with respect to the tank and arranged to engage the second pipe to hold the latter in position.

8. The combination of a tank, a generator therein, a fixed outlet pipe receiving gas from the generator, a pipe removably fitted over and rotatable on the outlet pipe, and a locking means on the tank for holding the second pipe in position and at the same time permitting the latter to rotate.

9. The combination of a portable water-containing tank, a generator removably mounted therein and portable therewith, and a gas outlet conduit for the generator mounted on the tank and portable therewith and arranged to remain in place during removal of the generator, said conduit consisting of two pipes one of which is fixed at its lower end to the bottom portion of the tank and is free from the latter at all points from the said fixed lower end to the upper end, and the other pipe having an open lower end to telescope vertically over the free portion of the first-mentioned pipe and communicating therewith, the second pipe extending to a greater height than the first.

10. The combination of a portable water-containing open-top tank, a removable generator mounted therein and portable therewith, and a gas outlet conduit for the generator mounted on the tank and portable therewith, said conduit consisting of an upright pipe having its lower end disposed below the generator and connected with the same, said lower end of the pipe being rigidly secured to the bottom portion of the tank and the upper end being open and disposed above the water level of the tank, and a second pipe extending into the top of the tank and open at its lower end and of greater diameter than the first pipe to loosely slip vertically over the open upper end of the latter, said second pipe being held upright by the first pipe and the space between the two pipes being adapted to be sealed by water to prevent leakage of gas.

11. The combination of a portable tank, a horizontal partition dividing the tank into an upper generating compartment and a lower washer compartment, said partition having openings, a generator in the upper compartment, a pipe carried by the generator and conducting gas therefrom, a pipe extending into the first pipe and open at its upper end to receive gas from the latter and having an open lower end entering the washer compartment through one of the openings of the partition to deliver gas to the said compartment, a fixed outlet pipe secured only at its lower portion to the tank and having its lower end communicating with the washer compartment through the other opening in the partition and open at its upper end, and a pipe loosely assembled over the outlet pipe to receive gas from the upper open end of the latter.

12. The combination of a tank, a partition dividing the tank into an upper generating compartment and a lower washer compartment, a fixed pipe passing through the upper compartment and having an open upper end disposed above the water level in the said compartment and having an open lower end communicating with the washer compartment through the partition, a generator removably mounted in the upper compartment, a pipe carried by and having its receiving end connected with the top of the generator and into which the first pipe extends to receive gas from the generator through the second pipe, an outlet pipe rigidly secured at its lower end to the tank and communicating with the washer compartment and having its upper end open, a pipe of larger diameter and longer than the outlet pipe and assembled vertically over the open upper end thereof and projecting above the same, and a device attached to the tank and engaged with the last-mentioned pipe for preventing the latter from lifting off the outlet pipe.

In testimony whereof I affix my signature in presence of two witnesses.

ALEXANDER F. J. JOHNSON.

Witnesses:
N. CONKLIN,
CARL W. STEFFENS.